(12) United States Patent
Lee et al.

(10) Patent No.: US 9,495,007 B2
(45) Date of Patent: *Nov. 15, 2016

(54) WEARABLE DEVICE AND METHOD OF CONTROLLING THEREFOR

(71) Applicant: LG ELECTRONICS INC., Seoul (KR)

(72) Inventors: Doyoung Lee, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,089

(22) Filed: Jan. 8, 2016

(65) Prior Publication Data

US 2016/0124504 A1 May 5, 2016

Related U.S. Application Data

(63) Continuation of application No. 14/477,330, filed on Sep. 4, 2014, now Pat. No. 9,261,955.

(30) Foreign Application Priority Data

Jun. 10, 2014 (KR) .......................... 10-2014-0070218

(51) Int. Cl.
| | |
|---|---|
| *G09G 5/00* | (2006.01) |
| *G06F 3/01* | (2006.01) |
| *G06F 3/0346* | (2013.01) |
| *G06F 1/16* | (2006.01) |
| *G02B 27/01* | (2006.01) |
| *G06F 3/033* | (2013.01) |
| *G06F 3/03* | (2006.01) |

(52) U.S. Cl.
CPC ........... *G06F 3/011* (2013.01); *G02B 27/0172* (2013.01); *G06F 1/163* (2013.01); *G06F 3/017* (2013.01); *G06F 3/0304* (2013.01); *G06F 3/0334* (2013.01); *G06F 3/0346* (2013.01); *G02B 2027/014* (2013.01); *G02B 2027/0138* (2013.01)

(58) Field of Classification Search
CPC G02B 27/0093; G02B 27/01; G02B 27/017; G02B 27/0172–27/0179; G02B 2027/0118; G02B 2027/0178; G02B 2027/0187; G06K 9/00221; G06K 9/00208; G06K 9/00335; G06K 9/00677; G06F 3/012; G06F 3/03547; G06F 3/04883
USPC ............................ 345/7, 8, 156, 173; 349/11
See application file for complete search history.

(56) References Cited

U.S. PATENT DOCUMENTS

| | | | |
|---|---|---|---|
| 8,253,685 B2 | 8/2012 | Katayama | |
| 9,041,741 B2 | 5/2015 | Mabbutt et al. | |

(Continued)

FOREIGN PATENT DOCUMENTS

| | | |
|---|---|---|
| JP | 7-95498 A | 4/1995 |
| JP | 2011-180867 A | 9/2011 |

*Primary Examiner* — Jennifer Nguyen
(74) *Attorney, Agent, or Firm* — Birch, Stewart, Kolasch & Birch, LLP

(57) ABSTRACT

A method of controlling a wearable device according to one embodiment of the present specification can include the steps of displaying content on a display unit of the wearable device, sensing a tilt angle of the wearable device and providing a control interface providing control of the content. And, the step of providing the control interface can include the steps of mapping the control interface to the ground based on the sensed tilt angle and a state of the wearable device and displaying the mapped control interface on the display unit.

2 Claims, 15 Drawing Sheets

(56) References Cited

U.S. PATENT DOCUMENTS

| | | | |
|---|---|---|---|
| 9,261,955 B2* | 2/2016 | Lee | G06F 3/011 |
| 2005/0264527 A1 | 12/2005 | Lin | |
| 2006/0197832 A1 | 9/2006 | Yamada et al. | |
| 2014/0118357 A1 | 5/2014 | Covington | |
| 2014/0267400 A1* | 9/2014 | Mabbutt | G06T 19/006 345/633 |

* cited by examiner

--PRIOR ART--

--PRIOR ART--

(a)

(b)

(a)

(b)

(a)

(b)

WEARABLE DEVICE AND METHOD OF CONTROLLING THEREFOR

CROSS-REFERENCE TO RELATED APPLICATIONS

This application is a Continuation of copending U.S. patent application Ser. No. 14/477,330 filed on Sep. 4, 2014, which claims priority under 35 U.S.C. §119(a) to Application No. 10-2014-0070218, filed in the Republic of Korea on Jun. 10, 2014, all of which are hereby expressly incorporated by reference into the present application.

BACKGROUND OF THE INVENTION

Field of the Invention

The present specification relates to a wearable device and a method of controlling therefor.

Discussion of the Related Art

FIG. 1 is a diagram for one example of a wearable device.

Recently, a wearable device mounted on a body of a user is using. For instance, a head mounted display shown in FIG. 1 is one example of the wearable device. As depicted in FIG. 1, the wearable device may have a form similar to glasses. Hence, a user can always wear the wearable device.

The head mounted display can be classified into an open-view type enabling a user to see a real object of a real world and a virtual reality image together and a closed-view type enabling the user to see the virtual reality image only. The head mounted display with an open-view can provide the user with enlarged immersion using AR (augmented reality) or MR (mixed reality).

FIG. 2 shows a situation that a user wearing a wearable device is not able to use both hands.

The wearable device can receive an input inputted by a hand. For instance, a user may control the wearable device by touching a bridge part of the wearable device. Yet, as depicted in FIG. 2, if both hands of the user are not available, it is not easy to control the wearable device. Moreover, the user may simply want to control the wearable device without using both hands. In order to solve the aforementioned problem, a method of controlling the wearable device by recognizing a gaze of a user is studying. Yet, in a situation that there exists an external object, it is difficult for a user to fix a gaze of the user to a single point.

SUMMARY OF THE INVENTION

Accordingly, the present specification is directed to an apparatus and method thereof that substantially obviate one or more problems due to limitations and disadvantages of the related art.

An object of the present specification is to provide a wearable device and a method of controlling therefor. In particular, the present specification intends to propose a more enhanced user interface in a manner of controlling the wearable device using a foot of a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a wearable device includes a display unit configured to display one or more images, a movement sensing unit configured to measure at least one of speed and movement of the wearable device, an angle sensing unit configured to sense a tilt angle of the wearable device, an image sensing unit configured to sense one or more real objects outside the wearable device and a processor configured to control the display unit, the movement sensing unit, the angle sensing unit and the image sensing unit, the processor configured to display content on the display unit, the processor configured to define at least one real object among the sensed one or more real objects as an input means, the processor, if the tilt angle of the wearable device is less than or equal to a first angle, configured to display a control interface providing control of the content on the display unit and terminate display of the control interface after a predetermined time, the processor, if the tilt angle of the wearable device exceeds a second angle and the movement sensing unit determines that the wearable device is in a stationary state, configured to map the control interface to the ground and display the mapped control interface on the display unit, wherein the control interface is controlled based on an input inputted by the input means and wherein the first angle is less than or equal to the second angle.

And, if the tilt angle of the wearable device exceeds the second angle and it is determined that the wearable device is in the stationary state, the processor can define at least one of a foot and a shoe of a user of the wearable device as the input means.

And, when at least one of the foot and the shoe of the user of the wearable device is defined as the input means, if the image sensing unit senses a hand of the user of the wearable device for more than a predetermined time, the processor can switch the input means to the hand of the user.

And, if the image sensing unit senses feet or a pair of shoes of the user of the wearable device, the processor can define a foot among the feet or a shoe among a pair of the shoes of the user of the wearable device as the input means.

And, the processor can define the foot or the shoe as the input means based on at least one selected from a group consisting of a predetermined preferred value, frequency in use of each leg of the user of the wearable device and movement of the feet or a pair of the shoes.

And, the processor can display the mapped control interface adjacent to the input means.

And, the control interface includes a plurality of images providing the control of the content and the processor can determine arrangement of a plurality of the images based on a direction of the foot or the shoe defined as the input means.

And, the control interface includes a plurality of images providing the control of the content and if the shoe of the user is defined as the input means, the processor can determine at least one selected from a group consisting of the image, arrangement of the image, a size of the image and the number of image based on a type of the shoe.

And, the processor can determine the type of the shoe based on at least one selected from a group consisting of a size of the sensed shoe, a shape of the shoe and a color of the shoe.

And, the processor can control a size of each of a plurality of the images based on at least one of a size of the shoe and sharpness of an end of the shoe.

Meanwhile, if at least one of the foot and the shoe of the user of the wearable device is defined as the input means, the processor can limit an input inputted by an external real object except the input means.

Meanwhile, the input inputted by the input means is determined based on a gesture of the input means and the gesture can include at least one selected from a group consisting of movement, hovering, holding, tapping and double tapping of the input means.

And, the control interface includes a plurality of images providing the control of the content and an input for at least one image among a plurality of the images can be inputted by a predetermined gesture of the input means only.

Meanwhile, if the tilt angle of the wearable device exceeds the second angle and it is determined that the wearable device is in the stationary state, the processor can determine at least one of a display position and a size of the control interface based on a condition of the ground sensed by the image sensing unit and the condition of the ground may include at least one selected from a group consisting of a color of the ground, continuity of the ground, height difference of the ground, flatness of the ground, inclination of the ground, material of the ground, a sign on the ground and an external real object on the ground.

And, the processor detects at least one of an obstacle and a safety danger based on the condition of the ground and can determine at least one of the display position and the size of the control interface to avoid at least one of the detected obstacle and the safety danger.

And, if a distance between the input means and at least one of the detected obstacle and the safety danger is greater than a predetermined distance, the processor displays the mapped control interface. If the distance between the input means and at least one of the detected obstacle and the safety danger is less than the predetermined distance, the processor may not display the mapped control interface.

And, the processor detects stairs based on the condition of the ground and can display the mapped control interface on a position of the display unit corresponding to a next step of a step on which the user of the wearable device is standing.

Meanwhile, if the tilt angle of the wearable device exceeds the second angle and it is determined that the wearable device is in the stationary state, the processor can display the mapped control interface on a predetermined position of the display unit or a position adjacent to the content.

Meanwhile, if the mapped control interface is displayed and the wearable device moves to the front or rear direction of the wearable device while maintaining a direction of the wearable device within the predetermined time, the processor can change a display size of the control interface based on a moving distance of the wearable device.

Meanwhile, if a speed of the wearable device is less than or equal to a predetermined speed or there is no movement of the wearable device, the processor can determine that the wearable device is in the stationary state.

To achieve these objects and other advantages and in accordance with the purpose of the invention, as embodied and broadly described herein, according to one embodiment, a method of controlling a wearable device includes the steps of displaying content on a display unit of the wearable device, sensing a tilt angle of the wearable device and providing a control interface providing control of the content. The control interface providing step includes the steps of if the sensed tilt angle is less than or equal to a first angle, defining one real object among one or more real objects outside the wearable device as a first input means, displaying the control interface on the display unit and terminating display of the control interface after a predetermined time.

And, if the sensed tilt angle exceeds a second angle and it is determined that the wearable device is in a stationary state based on at least one of speed and movement of the wearable device, the control interface providing step includes the steps of defining one real object among one or more real objects outside the wearable device as a second input means, mapping the control interface to the ground and displaying the mapped control interface on the display unit. The control interface is controlled based on an input inputted by at least one of the first and the second input means and the first angle may be less than or equal to the second angle.

According to the present specification, a wearable device can provide a more enhanced interface.

And, according to the present specification, a wearable device can sense a movement of the wearable device.

And, according to the present specification, a wearable device can provide a control interface in relation to a real object of real world.

And, according to the present specification, a wearable device can provide a safer control interface from safety danger of real world.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
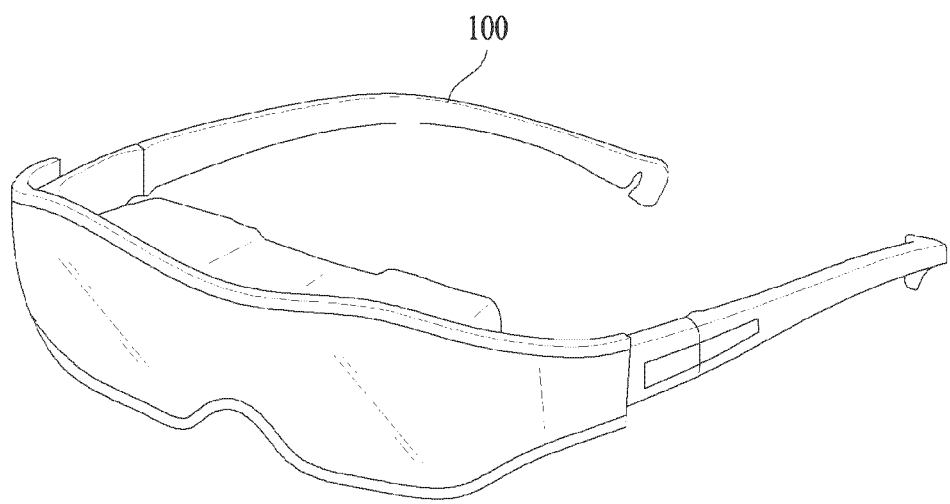
FIG. 1 is a diagram for one example of a wearable device.
Figure 2:
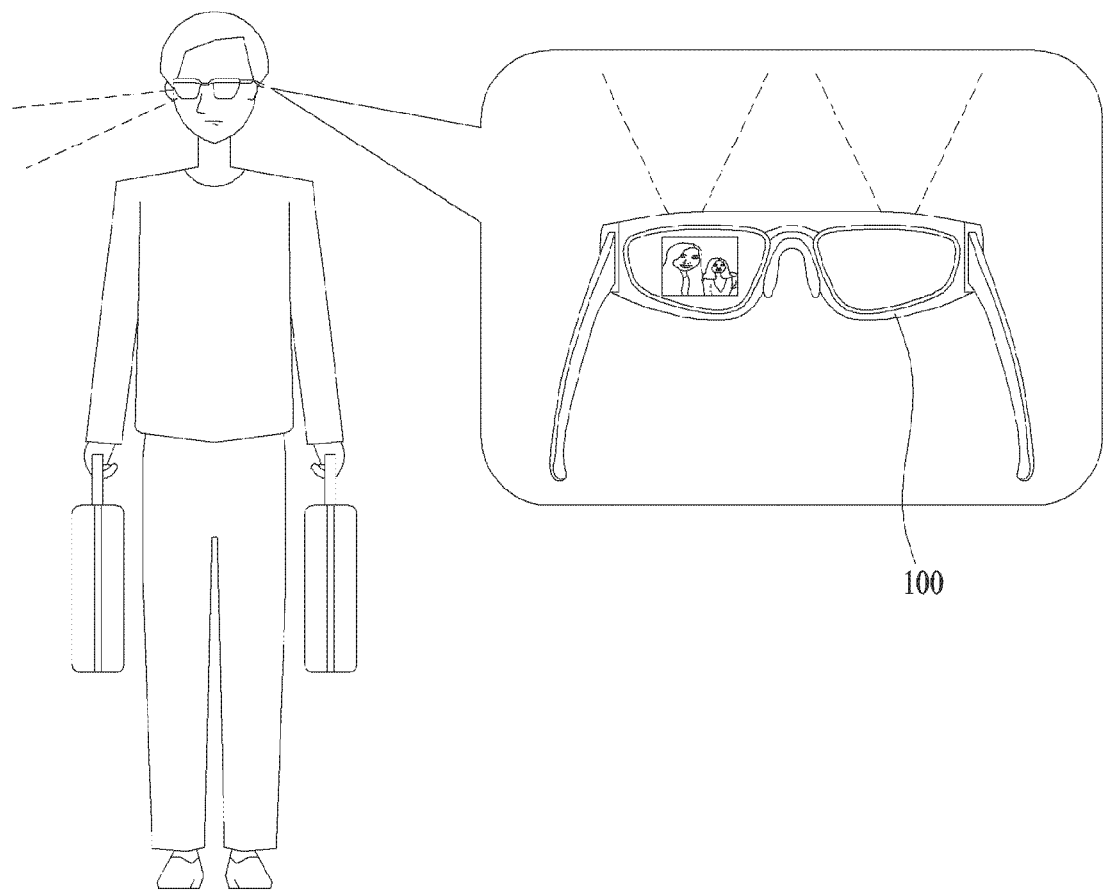
FIG. 2 shows a situation that a user wearing a wearable device is not able to use both hands.

Reference will now be made in detail to the preferred embodiments of the present specification, examples of which are illustrated in the accompanying drawings. While the embodiments have been concretely described with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

And, structural or functional explanations, which are specified for embodiments according to a concept of the present disclosure, are described to explain embodiments according to the concept of the present specification only. Hence, the embodiments according to the concept of the present specification can be implemented in various forms rather than construed as the embodiments explained in the present specification only.

Since the embodiments according to the concept of the present specification can have various modifications and forms, the present specification is explained in detail in a manner of showing examples of specific embodiments in drawings. Yet, the embodiments according to the concept of the present specification may be non-limited to the specified disclosure form. Instead, the embodiments according to the concept of the present specification needs to be construed as the embodiments including all changes, equivalents or substitutes included in an idea and a technological scope of the present specification.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For instance, a $1^{st}$ component may be named a $2^{nd}$ component while coming within the scope of the appended claims and their equivalents. Similarly, the $2^{nd}$ component may be named the $1^{st}$ component.

In the present application, such a terminology as 'comprise', 'include' and the like should be construed not as necessarily excluding various components or steps written in the present specification but as including the components or steps in part or further including additional components or steps. And, such a terminology as 'unit' written in the present specification indicates a unit processing at least one function or an operation and can be implemented by hardware, software or a combination thereof.

FIG. 1 is a diagram for one example of a wearable device.

FIG. 1 shows a wearable device 100 of a glasses type. Yet, the wearable device 100 of the present specification can include such various types of the wearable device as a helmet type wearable device, a cap type wearable device, a goggle type wearable device and/or a wearable device capable of being mounted on a head. In addition, the wearable device 100 may include a contact lens or a smart contact lens including a display. The wearable device 100 can display one or more contents without blocking vision for an external object of the wearable device 100. The wearable device 100 can provide augmented reality (AR) and/or mixed reality (MR) to a user.

Figure 3:
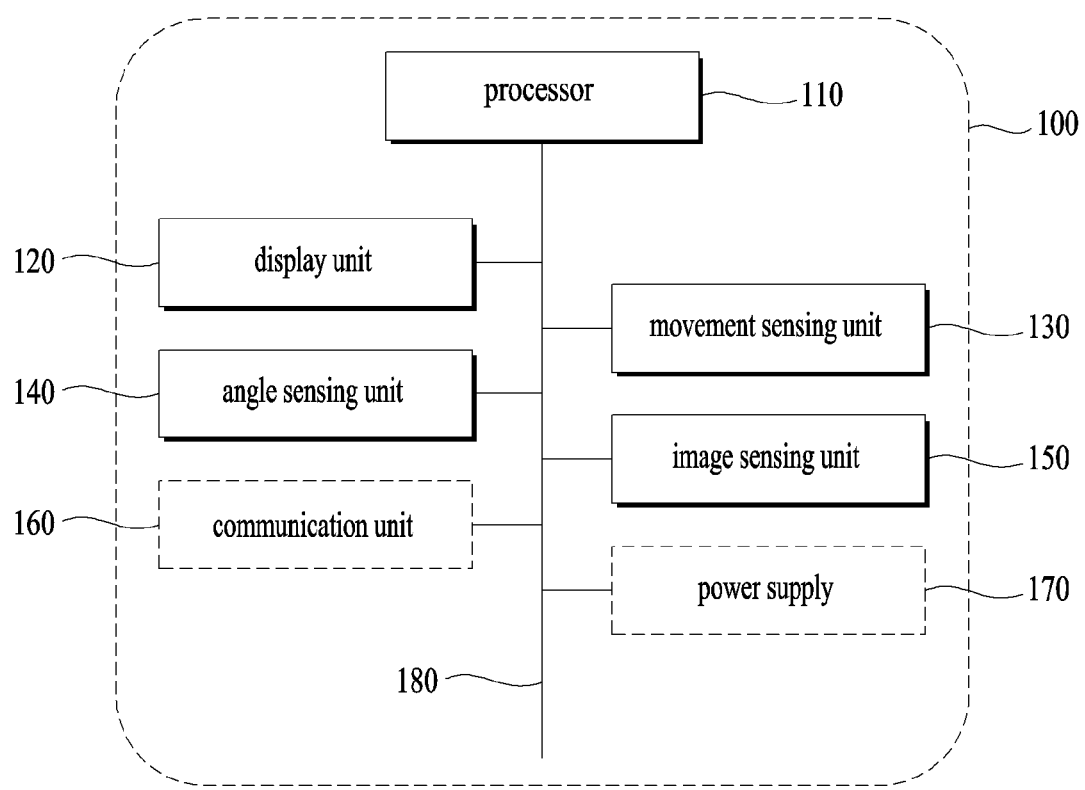
FIG. 3 is a block diagram of a wearable device.

FIG. 3 is a block diagram of a wearable device.

The wearable device 100 of the present specification can include a display unit 120 configured to display at least one image, a movement sensing unit 130 configured to measure at least one of a speed of the wearable device 100 and a movement of the wearable device, an angle sensing unit 140 configured to sense a tilt angle of the wearable device 100, an image sensing unit 150 configured to sense at least one real object outside the wearable device 100 and a processor 110 configured to control the display unit 120, the movement sensing unit 130, the angle sensing unit 140 and the image sensing unit 150. Operations of the wearable device 100 disclosed in the present specification can also be performed by the processor 110.

And, the wearable device 100 can further include a communication unit 160 configured to communicate with an external device and a power supply 170. Yet, the aforementioned configurations are not essential configurations of the wearable device 100. For instance, the wearable device 100 can separately receive power from an external power supply. And, the wearable device 100 may further include different configurations except the configurations depicted in FIG. 3. For instance, the wearable device 100 may further include a memory. Moreover, each of the configurations of the wearable device 100 can be connected with each other via a bus 180.

The display unit 120 may include a lens, a plane of projection, a projector and/or a prism. And, the display unit 120 may include any other transparent display units. The display unit 120 may display an external image of the wearable device 100 in real time.

The movement sensing unit 130 can include an accelerometer, a speedometer, a GPS (global positioning system), a gyro sensor, a magnetic field sensor and/or a proximity sensor. And, the movement sensing unit 130 can measure at least one of a speed and a movement of the wearable device 100 using the aforementioned image sensing unit 150.

The angle sensing unit 140 may include an accelerometer, a gyro sensor and/or a gravity accelerometer. The angle sensing unit 140 can sense a tilt angle of the wearable device 100. The tilt angle of the wearable device 100 can be sensed on the basis of a user wearing the wearable device 100 facing the front direction. Hence, when the user is looking at the ground, the tilt angle can be greater compared to a case that the user is looking at the front direction. Yet, the tilt angle of the wearable device 100 can also be sensed on the basis of a gravity direction. In this case, when the user is looking at the front direction, the tilt angle can be greater compared to a case that the user is looking at the ground. As mentioned in the foregoing description, the tilt angle of the wearable device 100 can be measured by various criteria. In the following, for clarity, assume that the tilt angle is sensed on the basis of the case that the user is looking at the front direction. Yet, those skilled in the art can understand that the tilt angle can be sensed by various criteria, by which the present specification may be non-limited.

The image sensing unit 150 can sense a real object existing in external of the wearable device 100. In particular, the image sensing unit 150 can sense a real object existing in a direction at which a user of the wearable device 100 is facing. The image sensing unit 150 can sense an image using visible light, infrared light, ultraviolet rays, a magnetic field and/or sound waves.

In the foregoing description, the configuration of the wearable device 100 is explained with reference to FIG. 1 and FIG. 3. In the following description, operations of the wearable device 100 shall be described according to the present specification. The operations of the wearable device 100 described in the following can be implemented by the aforementioned configuration (e.g., processor 110) of the wearable device 100.

Figure 4:
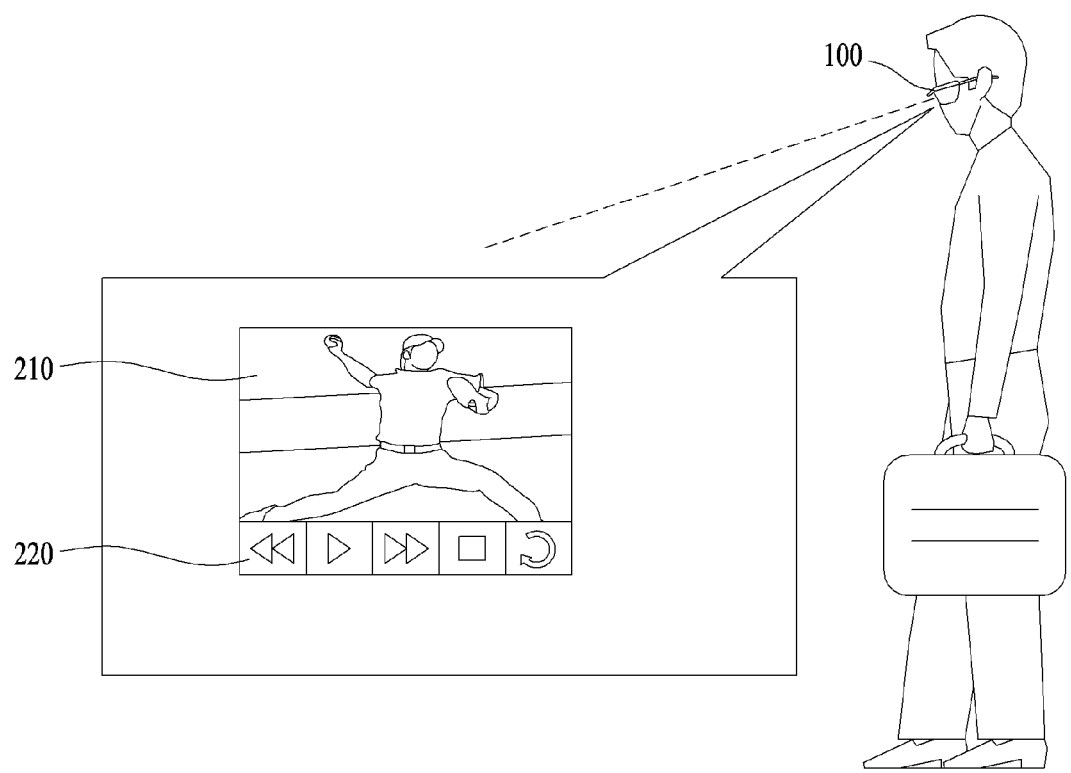
FIG. 4 is a diagram for a case that a user wearing a wearable device is facing the front.

FIG. 4 is a diagram for a case that a user wearing a wearable device is facing the front.

Referring to FIG. 4, a user of the wearable device 100 is walking while looking straight ahead. Content 210 is displayed on a display unit of the wearable device 100. The content 210 can include at least one of a still image and a video. The user can start to display the content by controlling the wearable device 100. When the display of the content 210 is started, a control interface 220, which provides the user with control of the content 210, is displayed on the display unit of the wearable device 100. The wearable device 100 may be able to determine that the user of the wearable device 100 is looking straight ahead by measuring a tilt angle of the wearable device 100.

And, the wearable device 100 can sense one or more real objects outside the wearable device 100 using an image sensing unit. The wearable device 100 can define at least one real object from the sensed one or more real objects as an input means. For instance, as depicted in FIG. 4, in case that the user of the wearable device 100 is looking straight ahead, a hand of the user of the wearable device 100 may be defined as the input means. The wearable device 100 may be able to define the hand of the user of the wearable device 100 as the input means by recognizing a shape of the hand of the user of the wearable device 100 sensed by the image sensing unit.

Meanwhile, the control interface 220 is controlled based on an input inputted by an input means. The control interface 220 may include a plurality of images providing control of the content 210. For instance, the control interface 220 may include images providing such a control as a playback of the content 210, rewind, fast forward, stop, play from the beginning and the like. Hence, if a hand of a user is defined as the input means, the user can select a preferred control from the control interface by stretching out the hand to a corresponding image. Moreover, the user may control the control interface 220 by controlling other input means (e.g., a button or a touch pad positioned at a bridge of the wearable device 100) positioned on the wearable device 100. The control interface 220 can be dimmed. In particular, the wearable device 100 can terminate display of the control interface 220 after a predetermined time. And, if an input from the user is received, the wearable device 100 can maintain the display of the control interface 220 as well.

Yet, as depicted in FIG. 4, if both hands of the user of the wearable device 100 are not available, it is very difficult for the user of the wearable device 100 to control the content 210 by hands.

Figure 5:
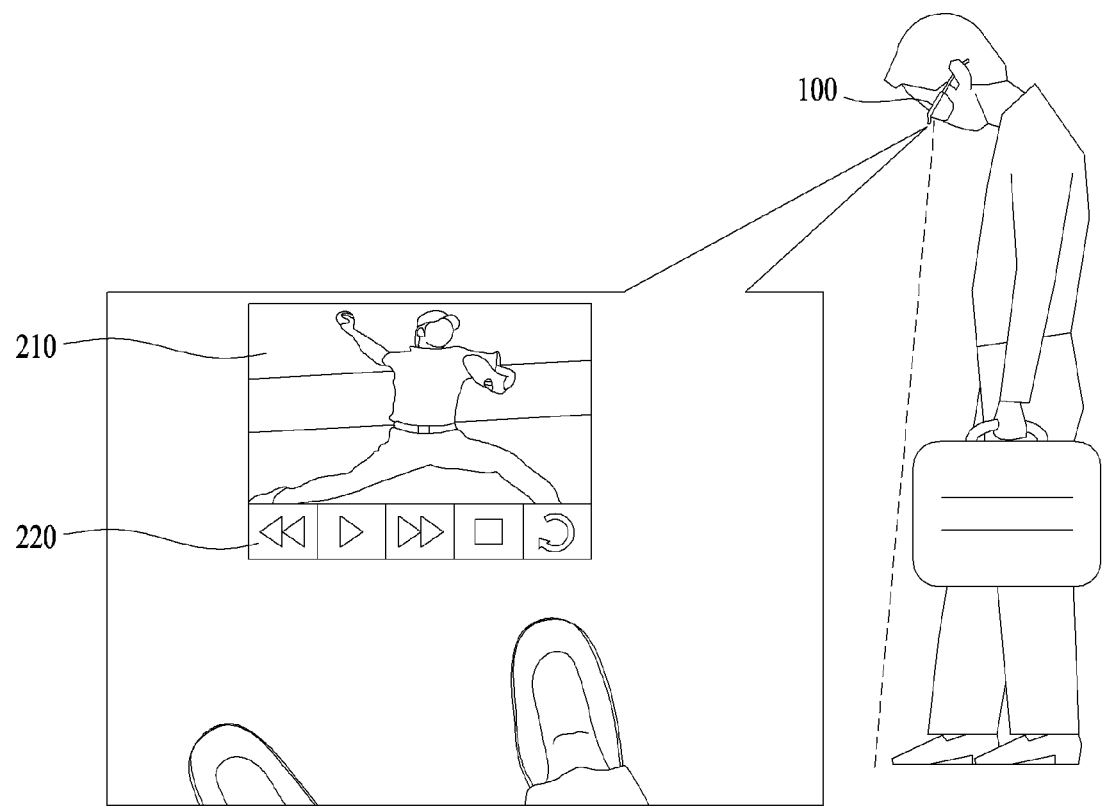
FIG. 5 is a diagram for a case that a user wearing a wearable device is facing the ground.

FIG. 5 is a diagram for a case that a user wearing a wearable device is facing the ground.

Referring to FIG. 5, content 210 is displayed on the display unit of the wearable device 100 and the user of the wearable device 100 pulled up and is looking at the ground. The wearable device 100 may be able to determine that the user of the wearable device 100 is looking at the ground in a manner of measuring a tilt angle of the wearable device 100. And, the wearable device 100 can determine whether the wearable device 100 is in a stationary state by sensing a movement of the wearable device 100. For instance, the wearable device 100 can sense the movement of the wearable device 100 using a speed of the wearable device 100, acceleration of the wearable device 100, a movement of the wearable device 100 and/or an external image of the wearable device 100. And, if the speed of the wearable device 100 is lower than a predetermined speed, it may determine that the wearable device 100 is in a stationary state. And, if there is no movement of the wearable device 100, it may also determine that the wearable device 100 is in the stationary state.

If the user of the wearable device 100 is looking at the ground and it is determined that the wearable device 100 is in the stationary state, the wearable device 100 maps the control interface 220 on the ground and displays the mapped control interface 220 on the display unit. If the control interface 220 is mapped on the ground, the control interface 220 is displayed like the control interface is drawn on the ground. The wearable device 100 may display the control interface 220 near the content 210. And, the wearable device 100 can display the control interface 220 on a predetermined position of the display unit. And, as described later, the wearable device 100 can display the control interface 220 on a position adjacent to an input means.

And, the wearable device 100 can sense one or more real objects outside the wearable device 100 using an image sensing unit. The wearable device 100 can define at least one real object among the sensed one or more real objects as an input means. For instance, as depicted in FIG. 5, in case that the user of the wearable device 100 is looking at the ground, shoes of the user of the wearable device 100 may be defined as the input means. The wearable device 100 may be able to define the shoes of the user of the wearable device 100 as the input means by recognizing a shape of the shoes of the wearable device 100 user sensed by the image sensing unit. Moreover, the wearable device 100 may also define a feet of the user, crutches, a pole held by a hand of the user, a stick or any other tools held by the user as the input means.

Meanwhile, the control interface 220 is controlled based on an input inputted by an input means. The control interface 220 may include a plurality of images providing control of the content 210. For instance, the control interface 220 may include images providing such a control as a playback of the content 210, rewind, fast forward, stop, play from the beginning and the like. Hence, if shoes of a user is defined as the input means, the user can select a preferred control from the control interface by stretching out the shoes of the user to a corresponding image. Moreover, the user may control the control interface 220 by controlling a different input means (e.g., a button or a touch pad positioned at a bridge of the wearable device 100) positioned at the wearable device 100. The wearable device 100 can continuously display the control interface 220 mapped on the ground while the wearable device 100 is in the stationary state and the user is looking at the ground. The control interface 220 can be dimmed as the wearable device 100 moves. Yet, although the wearable device 100 moves, the wearable device 100 can continuously display the control interface 220. For instance, once the control interface is mapped on the ground and displayed, the wearable device 100 can continuously display the control interface 220 while the user moves looking at the ground.

Figure 6:
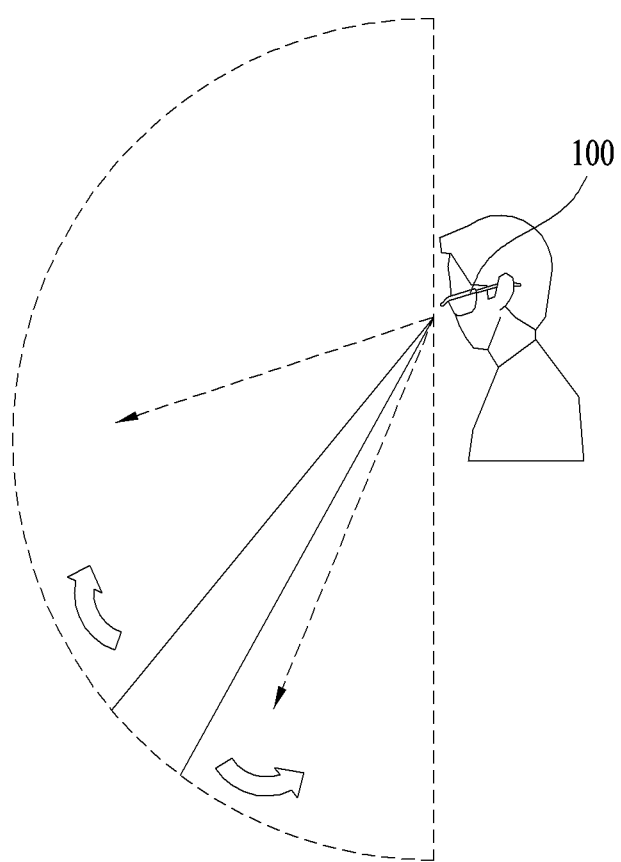
FIG. 6 is a diagram for a tilt angle of a wearable device.

FIG. 6 is a diagram for a tilt angle of a wearable device.

As mentioned earlier with reference to FIG. 3, the wearable device 100 can sense a tilt angle of the wearable device 100. The wearable device 100 can determine whether a user is gazing at the front or the ground using a range of a predetermined tilt angle. For instance, as shown in FIG. 6, a gaze direction of the user can be determined according to the range of the tilt angle. For instance, if the gaze direction of the user is less than a predetermined first tilt angle, the wearable device 100 can determine it as the user is gazing at the front. And, if the gaze direction of the user exceeds a predetermined second tilt angle, the wearable device 100 can determine it as the user is gazing at the ground. In this case, the first tilt angle may be less than or equal to the second tilt angle.

For instance, if an axis facing the front of the wearable device 100 is horizontal to a geoid surface, a tilt angle of the wearable device 100 can be defined as 0 degree. And, as a head of a user is lowered, it may be defined as the tilt angle is increasing. For instance, when the axis facing the front of the wearable device 100 is heading to the ground and is orthogonal to the geoid surface, the tilt angle of the wearable device 100 can be defines as 90 degrees. And, the axis facing the front of the wearable device 100 is heading to the sky and is orthogonal to the geoid surface, the tilt angle of the wearable device 100 can be defined as—90 degrees. Hence, as the axis facing the front of the wearable device 100 is heading to the ground, the tilt angle may increase. In this case, if the tilt angle is less than or equal to a prescribed angle, the wearable device 100 can determine it as the user is gazing at the front. For instance, if the tilt angle is less than or equal to 45 degrees, the wearable device 100 may determine it as the user is gazing at the front. And, if the tilt angle exceeds a prescribed angle, the wearable device 100 can determine it as the user is gazing at the ground. For instance, if the tilt angle exceeds 45 degrees, the wearable device 100 can determine it as the user is gazing at the ground. In this case, 45 degrees can be replaced with a different value.

And, as mentioned in the foregoing description, the tilt angle can be defined on the basis of a gravity direction. In this case, if the axis facing the front of the wearable device 100 is heading to the ground and is orthogonal to the geoid surface, the tilt angle of the wearable device 100 can be defined as 0 degree. And, if the axis facing the front of the wearable device 100 is heading to the sky, it can be defined as the tilt angle is increasing. In this case, if the tilt angle exceeds a prescribed angle, the wearable device 100 can determine it as the user is gazing at the front.

As mentioned in the foregoing description, the tilt angle can vary according to a criterion of the tilt angle. Yet, for clarity, assume that the tilt angle is increasing as the axis facing the front of the wearable device 100 is heading to the ground in the following description.

Figure 7:
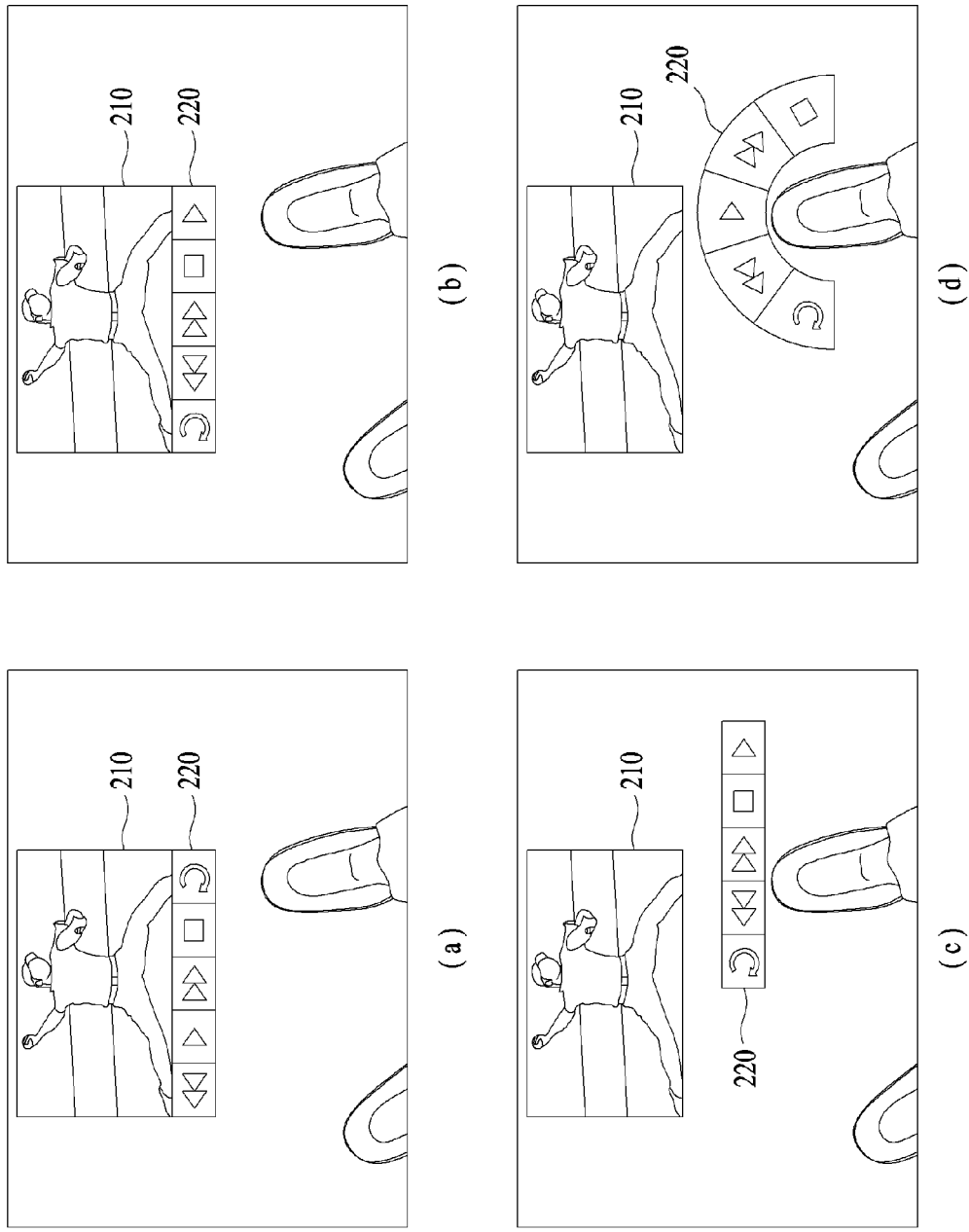
FIG. 7 is a diagram for examples of a control interface mapped to the ground.

FIG. 7 is a diagram for examples of a control interface mapped to the ground.

The wearable device 100 can define shoes or feet of a user as an input means. And, if feet or a pair of shoes of the user are sensed by the image sensing unit, the wearable device 100 can define a foot among the feet of the user of the wearable device 100 or a shoe among a pair of the shoes as an input means. For instance, the wearable device 100 can define a foot or a shoe as the input means based on at least one selected from a group consisting of a predetermined preferred value, frequency in use of each leg of the user of the wearable device 100 and movement of the feet or a pair of shoes. For instance, a more frequently used foot (or a shoe) for the control of the control interface 220 or a foot (or a shoe), which has moved immediately before the control interface 220 is displayed, can be defined as the input means. For instance, among the feet (or a pair of the shoes), a foot (or a shoe) stayed a step ahead of the other can be defined as the input means.

Referring to FIG. 7, content 210 and the control interface 220 are displayed on the display unit of the wearable device 100. The control interface 220 is displayed in a manner of being mapped to the ground. Referring to FIG. 7, the wearable device 100 displays the control interface 220 in relation to a position of a pair of shoes. In FIG. 7, although an input means corresponds to a right shoe of the user of the wearable device 100, as mentioned earlier with reference to FIG. 5, various external real objects can be defined as the input means. For instance, a left shoe of the user of the wearable device 100 can be defined as the input means as well.

FIG. 7 (a) is a diagram for one embodiment of the control interface 220. The control interface 220 includes a plurality of images providing control of the content 210.

The wearable device 100 can determine arrangement of a plurality of the images included in the control interface based on a foot or a direction of a shoe defined as the input means. Referring to FIG. 7 (b), the wearable device 100 makes an array of a plurality of the images in relation to a right shoe of the user. For instance, as shown in FIG. 7 (b), a plurality of the images can be lined up in a manner that a playback image is to be near the right shoe.

And, the wearable device 100 can display the control interface 220 near the foot or the shoe defined as the input means. Referring to FIG. 7 (c), the wearable device 100 displays the control interface 220 near the right shoe of the user. And, as depicted in FIG. 7 (d), the wearable device 100 can display the control interface 220 as a semicircle form adjacent to the input means. In this case, all of a plurality of the images included in the control interface 220 can be displayed near the input means.

Figure 8:
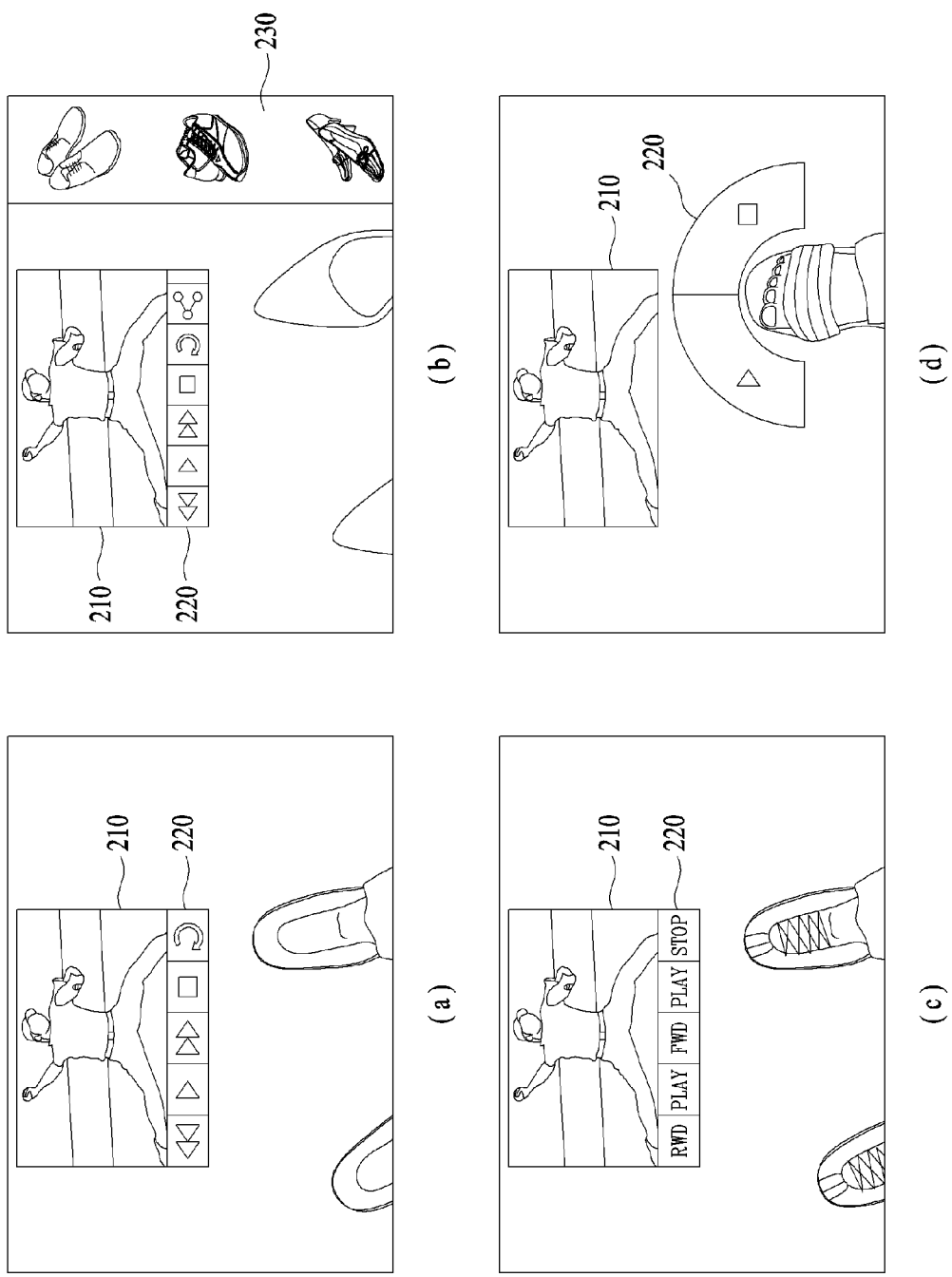
FIG. 8 is a diagram for examples of a control interface based on shoes.

FIG. 8 is a diagram for examples of a control interface based on shoes.

As mentioned in the foregoing description, the control interface 220 can include a plurality of images providing control of content 210. In case that shoes of a user is defined as an input means, the wearable device 100 can determine at least one selected from a group consisting of an image itself, arrangement of images, a size of images and the number of images based on a type of the shoes. And, the wearable device 100 can determine the type of the shoes based on at least one selected from a group consisting of a size, a shape, and color of the shoes. Hence, the control interface 220 can be customized according to the type of the shoes defined as the input means.

Referring to FIG. 8 (a), the wearable device 100 determines the shoes of the user as men's shoes and can display the control interface 220 corresponding to the men's shoes.

And, referring to FIG. 8 (b), high heels are defined as an input means. Referring to FIG. 8 (b), the control interface 220 includes more images compared to the control interface depicted in FIG. 8 (a). And, a size of each image is smaller than each image depicted in FIG. 8 (a). In particular, the wearable device 100 can determine the number of images in response to the type of shoes. And, the wearable device 100 may control the size of the images included in the control interface 220 based on at least one of size of shoes and sharpness of tip of shoes.

Meanwhile, a selection guide 230 is shown in the right of FIG. 8 (b). For instance, the selection guide 230 enables a user to select a type of shoes defined as a current input means. Hence, the user can select the control interface 220 which is customized according to each shoes in a manner of selecting the type of shoes using the selection guide 230.

Referring to FIG. 8 (c), sneakers are defined as an input means. The wearable device 100 can display the control interface 220 including images corresponding to the sneakers. In particular, the wearable device 100 can determine an image itself included in the control interface 220 based on a type of shoes of a user.

Referring to FIG. 8 (d), slippers are defined as an input means. For instance, since an end of the slippers is rounded and is not comfortable to move, the wearable device 100 can display the control interface 220 including less number of images. And, the control interface 220 can be displayed near the slippers in a circle form to make a user select an image with a smaller move.

And, the wearable device 100 may use shoes (e.g., slippers) as a marker. The wearable device 100 can display the control interface 220 adjacent to the shoes. A user takes off the shoes and may be then able to perform an input for the control interface 220 with a foot. In this case, the wearable device 100 displays the control interface 220 near the marker (shoes) and may define the foot of the user as an input means.

Figure 9:
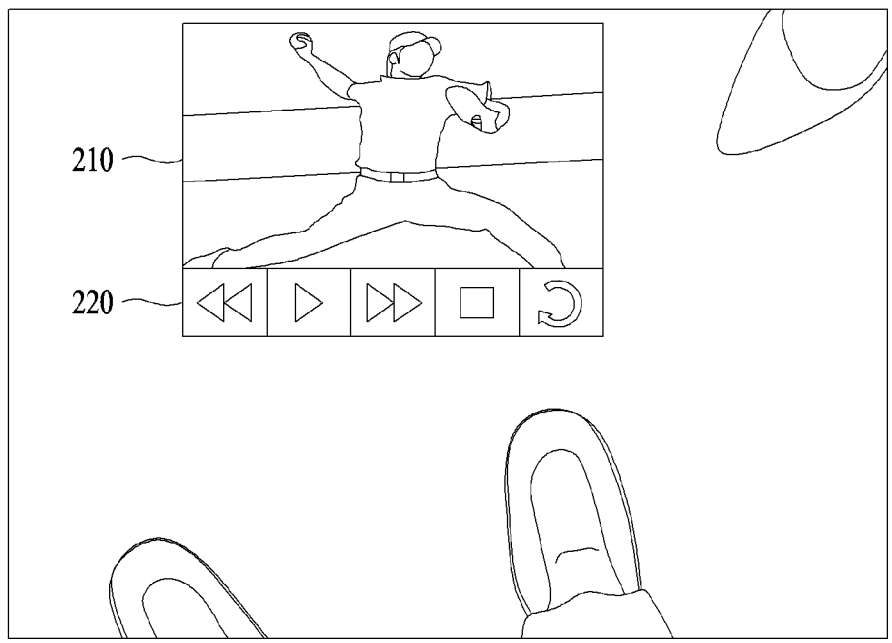
FIG. 9 is a diagram for explaining an operation of a control interface of a wearable device according to one embodiment.

FIG. 9 is a diagram for explaining an operation of a control interface of a wearable device according to one embodiment.

Referring to FIG. 9, shoes of a user is defined as an input means. In this case, a foot or a shoe of a passerby can be sensed by the wearable device 100. In order to prevent an input of the passerby from being sensed, once at least one of the feet and the shoes of the user are defined as the input means, the wearable device 100 can limit an input inputted by an external real object other than the defined input means.

Figure 10:
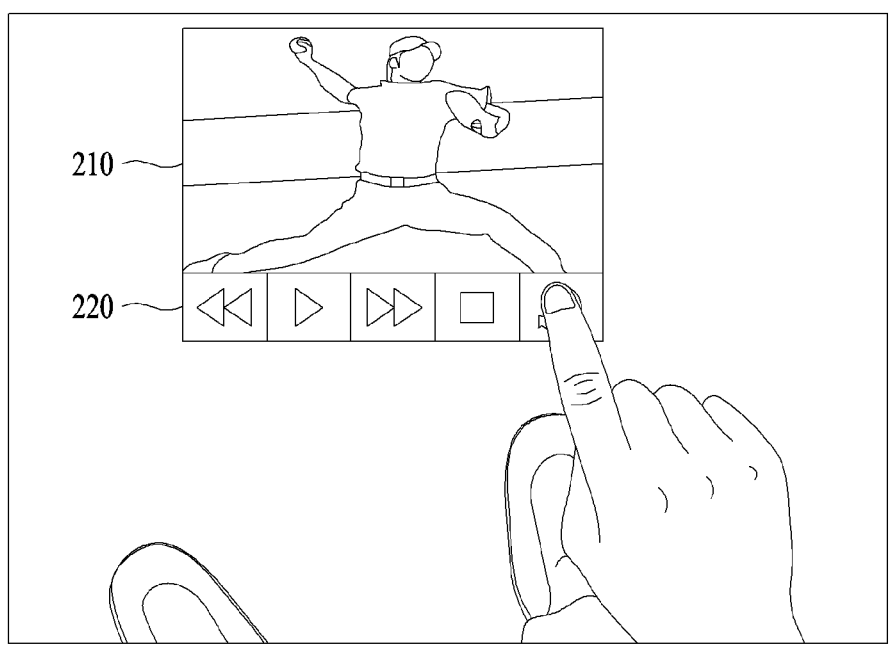
FIG. 10 is a diagram for explaining an operation of a control interface of a wearable device according to a different embodiment.

FIG. 10 is a diagram for explaining an operation of a control interface of a wearable device according to a different embodiment.

As mentioned earlier with reference to FIG. 5 and FIG. 9, the wearable device 100 can define feet or shoes of a user as an input means and can limit an input inputted by an external real object except the input means. Yet, as depicted in FIG. 10, the user of the wearable device 100 may want to control the control interface 220 using a hand of the user again. If the hand of the user is sensed by the image sensing unit for more than a predetermined time, the wearable device 100 can switch the input means to the hand of the user. And, if a different input (e.g., an input inputted via a button or a touch pad positioned at the wearable device 100) inputted by the hand of the user is received, the wearable device 100 may switch the input means to the hand of the user.

Figure 11:
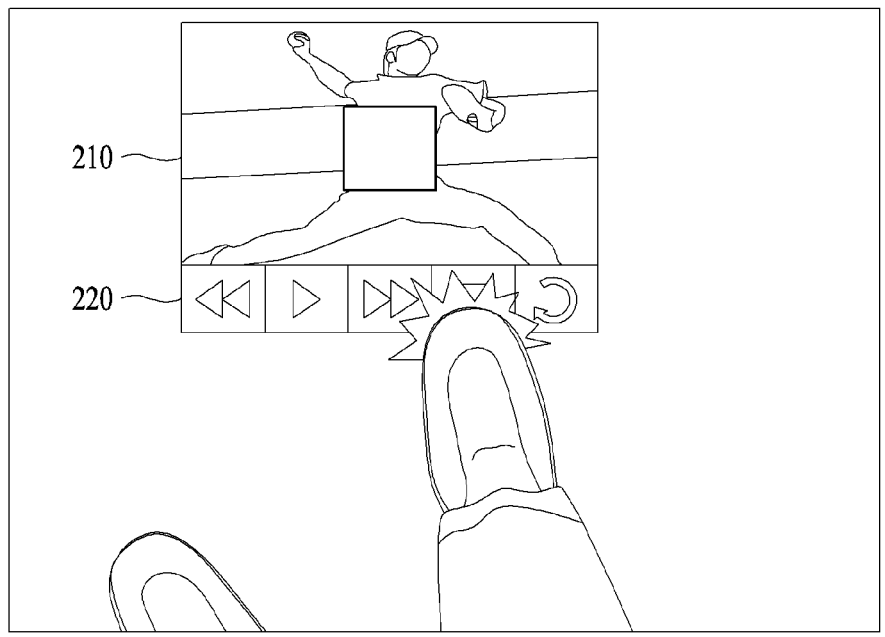
FIG. 11 is a diagram for examples of a gesture.
Figure 11:
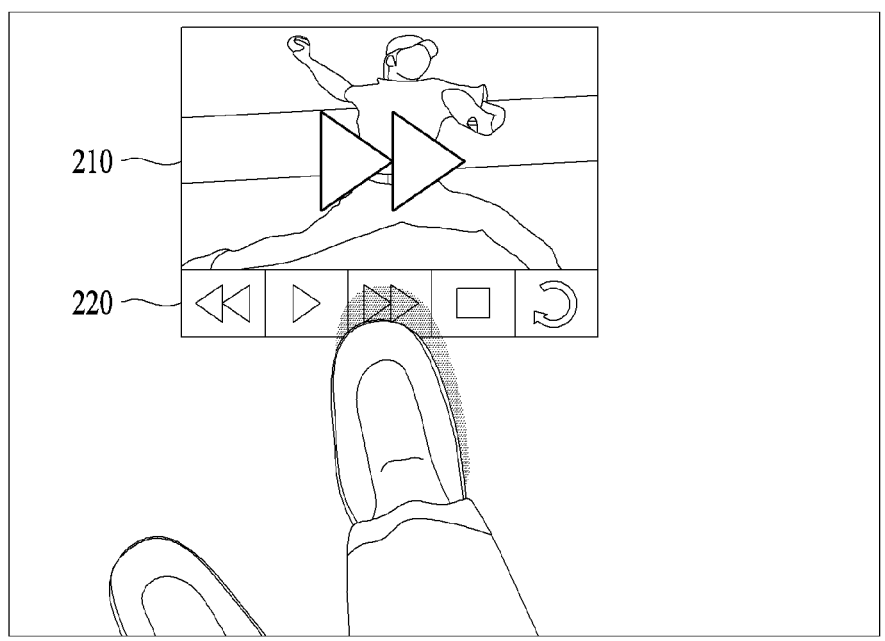

FIG. 11 is a diagram for examples of a gesture.

The wearable device 100 can be controlled based on an input inputted by an input means. And, the input inputted by the input means can be determined based on a gesture of the input means. For instance, the gesture can include at least one selected from a group consisting of movement, hovering, holding, tapping and double tapping of the input means. The wearable device 100 may sense the gesture of the input means using the image sensing unit.

Referring to FIG. 11. The control interface 220 including a plurality of images and mapped to the ground is displayed. After feet or shoes of a user are defined as an input means, the user can control content 210 in a manner of performing a gesture for a preferred image. For instance, the user can perform a control corresponding to an image in a manner of hovering the foot on the displayed image. Yet, in order to prevent the user from inputting a wrong input, an input for the image can be inputted by a predetermined gesture only. And, some control for the wearable device 100 can be limited to be inputted by a physical input only. Meanwhile, if a gesture input is attempted for a limited control, the control may provide a guide indicating that a predetermined input (e.g., a physical input) is required.

Referring to FIG. 11 (a), a user taps a stop image of the control interface 220. An input for the stop image may be inputted by a tapping only. And, an input for the stop/playback can be limited to be inputted by a double tapping of the user only. Moreover, the wearable device 100 may recognize an input only when a user holds a foot on a corresponding position for more than a prescribed time after a tapping.

Referring to FIG. 11 (b), an input means (a shoe) is hovering on a fast forward image by a user. The wearable device 100 can continuously fast forward the content 210 while the hovering is maintained.

The gesture described in FIG. 11 is just an example A gesture of various input means can be used. And, gestures different from each other can be used according to a control type for the content 210. For instance, stop/playback may require a more complex gesture compared to a different control.

Figure 12:
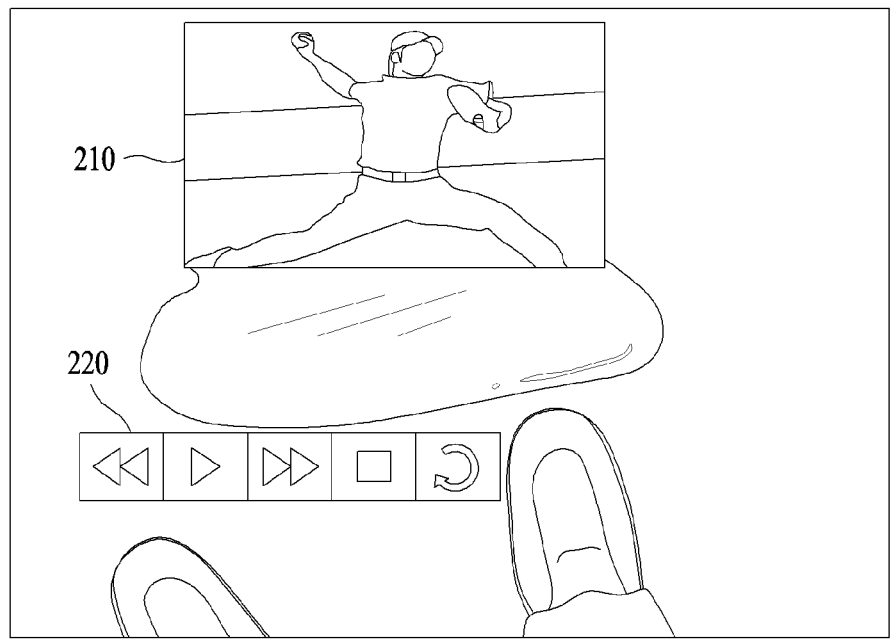
FIG. 12 is a diagram for a control interface mapped to avoid a specific position.

FIG. 12 is a diagram for a control interface mapped to avoid a specific position.

When a control interface 220 mapped to the ground is displayed, the wearable device 100 can determine at least one of a display position and a size of the control interface based on a ground condition sensed by the image sensing unit. And, the ground condition can include at least one selected from a group consisting of color of the ground, continuity of the ground, height difference of the ground, flatness of the ground, inclination of the ground, material of the ground, a sign on the ground and an external real object on the ground. For instance, the wearable device 100 can sense the ground condition in a manner of measuring depth of the ground, color of the ground and the like.

Referring to FIG. 12, there exists a puddle on the ground. In this case, the wearable device 100 displays the control interface 220 in a manner of avoiding the puddle. FIG. 12 shows an example of displaying the control interface in a manner of avoiding something. The wearable device 100 can detect at least one of an obstacle and a safety danger based on a sensed ground condition. For instance, the puddle depicted in FIG. 12 can be classified into the obstacle and/or the safety danger. And, the wearable device 100 can determine at least one of a display position and a size of the control interface 220 to avoid a detected obstacle and/or a safety danger.

For instance, a point on the ground where a rapid inclination change exists can be detected as an obstacle. Hence, the wearable device 100 can display the control interface 220 in a manner of avoiding the point detected as the obstacle. And, the wearable device 100 may detect a prominent external real object (e.g., a foot of a different person on the ground, a prominent block on the ground and the like) on the ground as an obstacle.

For instance, the wearable device 100 can detect a motoring road, a crosswalk, a sharp object on the ground, ice on the ground, a puddle on the ground, a hole on the ground and the like as a safety danger.

Figure 13:
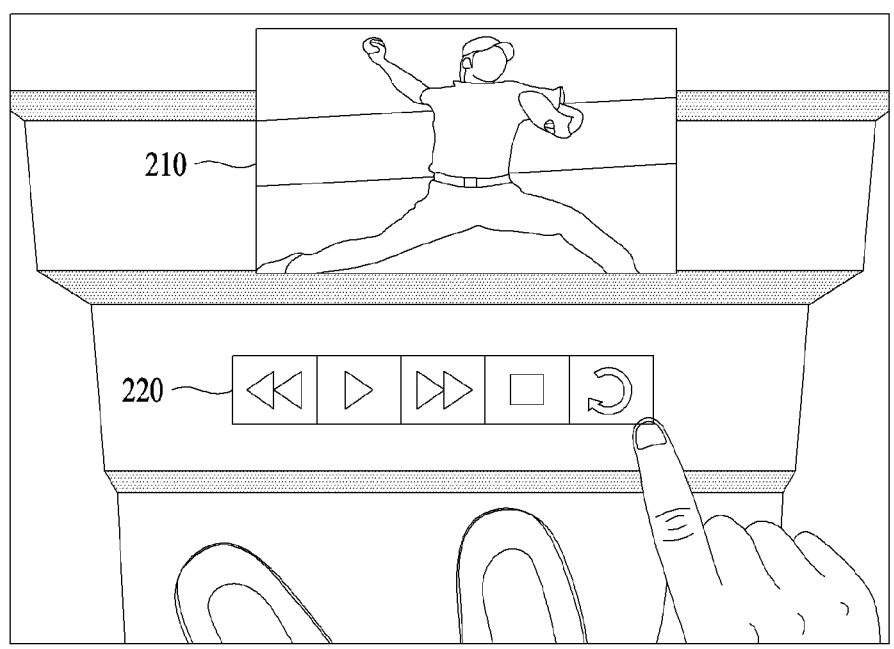
FIG. 13 is a diagram for a control interface mapped to stairs.

FIG. 13 is a diagram for a control interface mapped to stairs.

Referring to FIG. 13, a user is in a stationary state while looking at a floor in the middle of going up the stairs. In this case, the wearable device 100 can detect the stairs based on the ground condition. For instance, the wearable device 100 may detect the stairs based on discontinuity of the ground or depth of the ground. And, the wearable device 100 can display the control interface 220 mapped to the ground in a position of the display unit corresponding to a next step of a step on which the user is standing.

Meanwhile, as depicted in FIG. 13, a hand of the user can be switched to an input means. Regarding this, it is identical to what is mentioned earlier with reference to FIG. 10. And, as an example, the control interface 220 can be mapped to the ground of steep inclination and displayed in the same ground. In this case, an input by the hand of the user may become easier. Hence, the wearable device 100 can switch the input means to the hand of the user or an object held by the hand of the user. And, once the control interface 220 is displayed, the control interface can be continuously displayed although the user starts to move again. In this case, the wearable device 100 can receive an input when the wearable device 100 determines that the wearable device is in a stationary state only. And, the wearable device 100 may receive an input when the input means is switched from a foot or a shoe to a different input means (e.g., a hand of the user) only.

Figure 14:
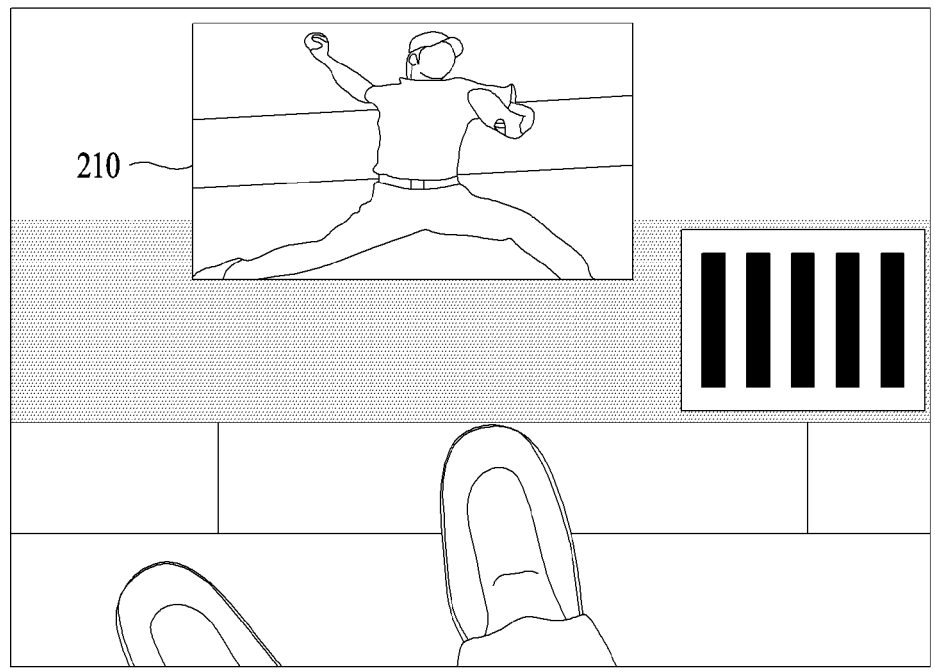
FIG. 14 is a diagram for a control interface based on a safety danger.
Figure 14:
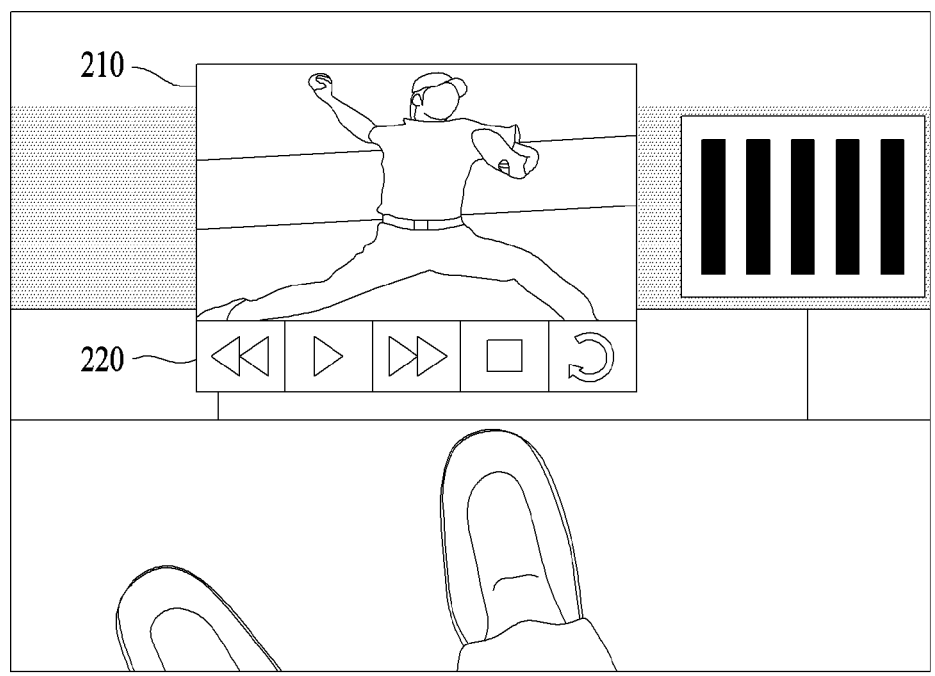

FIG. 14 is a diagram for a control interface based on a safety danger.

As mentioned earlier with reference to FIG. 13, the wearable device 100 can detect at least one of an obstacle and a safety danger. And, if a distance between an input means and at least one of the detected obstacle and the safety danger is greater than a predetermined distance, the wearable device 100 can display a control interface mapped to the ground. And, if the distance between the input means and at least one of the detected obstacle and the safety danger is less than the predetermined distance, the wearable device 100 may not display the control interface mapped to the ground.

Referring to FIG. 14, a user is standing on a sidewalk to cross the street at a crosswalk.

Referring to FIG. 14 (*a*), if a control interface 220 is displayed, the user may be in danger since the user should stretch out a foot of the user to the motor road to perform an input for the control interface 220. The wearable device 100 can detect a safety danger (e.g., a crosswalk or a motor road) based on at least one selected from a group consisting of color of the ground, height difference of the ground and a sign on the ground (e.g., a crosswalk mark or a traffic lane mark). Referring to FIG. 14 (*a*), since a distance between an input means (a foot of a user) and the street is too close, the wearable device 100 may not display the control interface 220.

Referring to FIG. 14 (*b*), the user takes a step backwards from the street. In this case, since a sufficient distance from a safety danger (e.g., a crosswalk or a motor road) is secured, the wearable device 100 may display the control interface 220.

Figure 15:
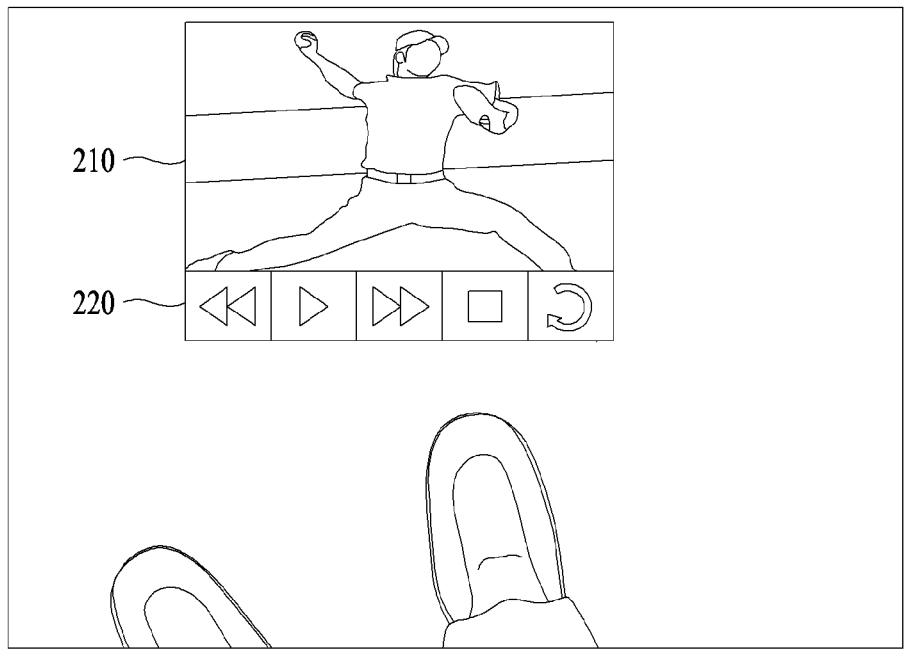
FIG. 15 is a diagram for a method of changing a size of a display of a control interface according to a movement of a wearable device.
Figure 15:
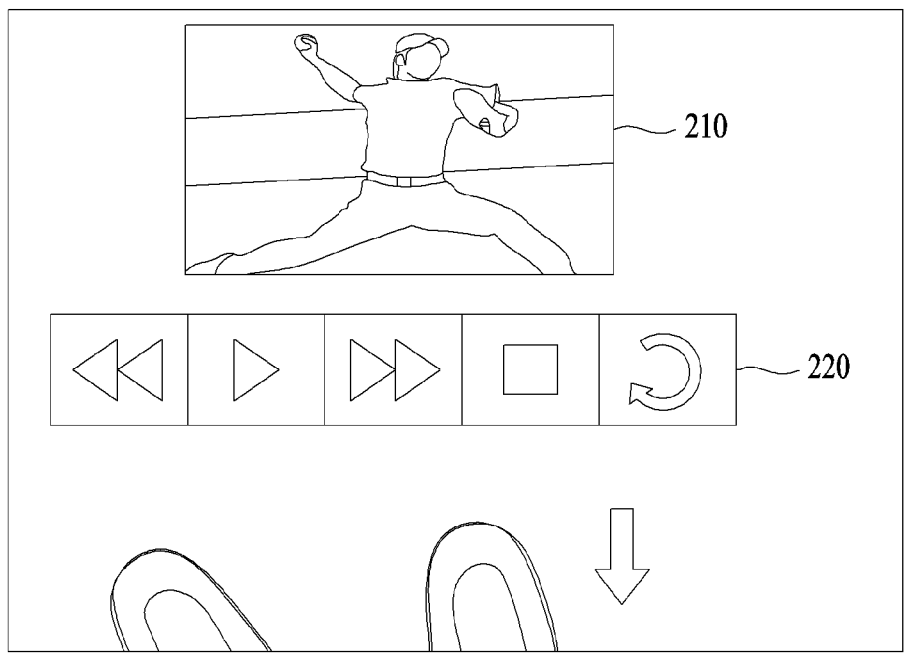

FIG. 15 is a diagram for a method of changing a size of a display of a control interface according to a movement of a wearable device.

Referring to FIG. 15 (*a*), a foot of a user is defined as an input means and a control interface 220 is displayed. In this case, the user may want to enlarge the control interface 220 to more easily control the control interface.

Referring to FIG. 15 (*b*), the user takes a step backwards while facing the front direction within a predetermined time after the control interface 220 is displayed. By doing so, the wearable device 100 can display the control interface 220 in a manner of enlarging the control interface. On the contrary, the user can reduce a size of the control interface 220 in a manner of taking a step forwards.

Hence, if the control interface 220 is displayed and the wearable device 100 moves forward or backward of the wearable device 100 within a predetermined time while maintaining a direction of the wearable device 100, the wearable device 100 can change a display size of the control interface 220 based on a moving distance of the wearable device 100.

Meanwhile, the wearable device 100 may share a controllability of the control interface 220 with a different device. For instance, the wearable device 100 can perform mirroring with a different display device. In this case, content 210 and the control interface 220 can be displayed on the different display device. If an input for the control interface 220 is received by the different display device, the content 210 of the wearable device 100 may be controlled based on the input. For instance, the user of the wearable device 100 may want a different user sharing the content 210 to control the content 210 instead of directly controlling the content 210.

In the following, a method of controlling a wearable device according to the present specification is explained. The method of controlling the wearable device described in the following can be combined with the configuration and operation of the wearable device mentioned earlier with reference to FIG. 1 to FIG. 15.

Figure 16:
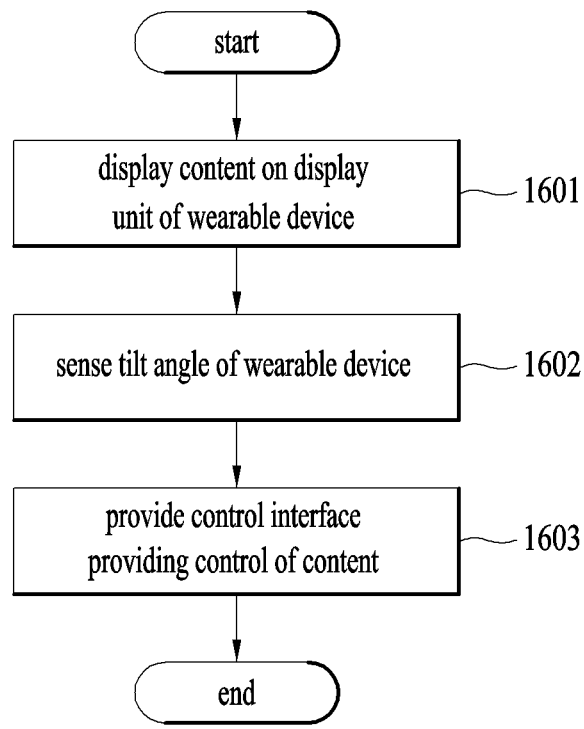
FIG. 16 is a flowchart for a method of controlling a wearable device according to one embodiment.

FIG. 16 is a flowchart for a method of controlling a wearable device according to one embodiment.

The wearable device can display content on the display unit of the wearable device [1601]. As mentioned earlier with reference to FIG. 1 and FIG. 3, the wearable device can display the content based on various inputs. And, the wearable device senses a tilt angle [1602] and can provide a control interface providing control of the content [1603]. This can also be performed according to what is mentioned earlier with reference to FIG. 3 to FIG. 6. The method of controlling the wearable device depicted in FIG. 16 can be repeatedly performed. For instance, the wearable device continuously or periodically senses a tilt angle and can provide a control interface in response to the sensed tilt angle as described in the following.

Figure 17:
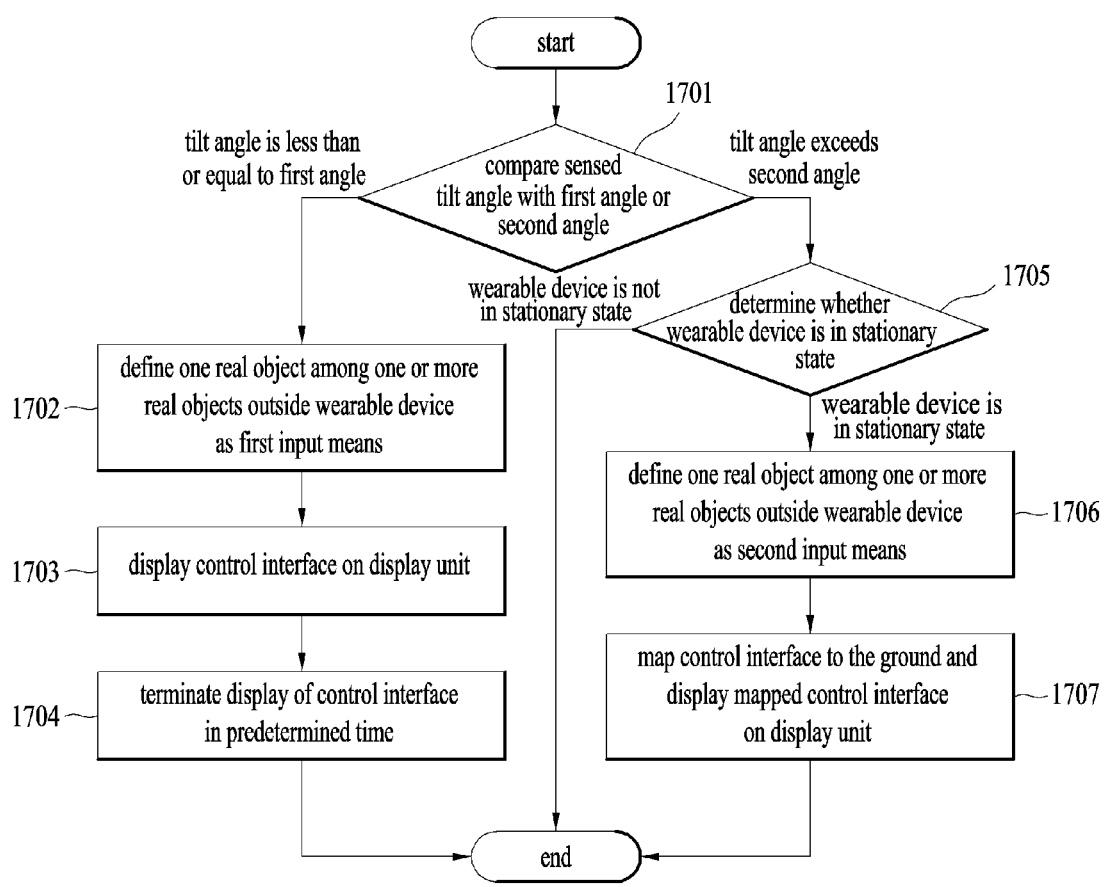
FIG. 17 is a flowchart for a method of controlling a wearable device according to one embodiment.

FIG. 17 is a flowchart for a method of controlling a wearable device according to one embodiment.

The step (the step 1603 in FIG. 16) of providing the control interface in FIG. 16 can include following steps. First of all, the wearable device compares the sensed tilt angle with a first angle or a second angle [1701]. As mentioned earlier with reference to FIG. 6, the first angle is less than or equal to the second angle. If a tilt angle is less than or equal to the first angle, it may be determined as a user is looking at the front. And, if the tilt angle exceeds the second angle, it may be determined as the user is looking at the ground.

Once it is determined that the tilt angle is less than or equal to the first angle, one real object among one or more real objects outside the wearable device is defined as a first input means [1702]. As mentioned earlier with reference to FIG. 4, for instance, a hand of the user can also be defined as the first input means. And, the wearable device displays a control interface providing control of content on the display unit [1703] and can terminate the display of the control interface when a predetermined time elapses [1704]. As mentioned earlier with reference to FIG. 4, the control interface can be dimmed or continuously displayed.

Meanwhile, if it is determined that the tilt angle exceeds the second angle, the wearable device determines whether the wearable device is in a stationary state [1705]. If the wearable device is not in the stationary state, the wearable device does not display the control interface. If it is determined that the wearable device is in the stationary state, the wearable device can define one real object among one or more real objects outside the wearable device as a second input means [1706]. As mentioned earlier with reference to FIG. 5, for instance, a foot or a shoe of the user can be defined as the second input means. And, the wearable device maps the control interface to the ground and can display the mapped control interface on the display unit [1707]. And, as mentioned earlier with reference to FIG. 7 to FIG. 16, the method of controlling the wearable device according to the present specification can change the mapped control interface based on various criteria. For instance, the wearable device can determine at least one selected from a group consisting of a size, a shape and a position of the control interface based on at least one selected from a group consisting of a type of an input means, a position of the input means, an obstacle and a safety danger.

A wearable device according to the present specification and a method of controlling therefor may not limitedly apply to the composition and method of the aforementioned embodiments. The aforementioned embodiments may be configured in a manner of being selectively combined the whole of the embodiments or a part of the embodiments to achieve various modifications.

Meanwhile, a wearable device according to the present specification and a method of controlling therefor can be implemented with a software readable by a processor in a recording media readable by the processor, which is equipped in the display device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A wearable device, comprising:
    a display unit configured to display one or more images;
    a movement sensing unit configured to measure at least one of a speed or a movement of the wearable device;
    an angle sensing unit configured to sense a tilt angle of the wearable device;
    an image sensing unit configured to sense one or more real objects; and
    a processor configured to control the display unit, the movement sensing unit, the angle sensing unit and the image sensing unit,
    wherein the processor is further configured to:
    control the display unit to display content, and
    control the display unit to display a control interface providing control of the content depending on both the speed of the wearable device sensed by the movement sensing unit and the tilt angle of the wearable device sensed by the angle sensing unit.

2. A method of processing data in a wearable device, the method comprising:
    displaying one or more images in a display unit;
    measuring at least one of a speed or a movement of the wearable device in a movement sensing unit;
    sensing a tilt angle of the wearable device;
    sensing one or more real objects;
    controlling the display unit to display content, and
    controlling the display unit to display a control interface providing control of the content depending on both the speed of the wearable device sensed by the movement sensing unit and the sensed tilt angle of the wearable device.

* * * * *